3,231,710
METHODS OF RESISTANCE WELDING FOR USE, FOR EXAMPLE, IN THE MANUFACTURE OF ELECTRONIC ASSEMBLIES
Peter Alan Barnet, Pinner, and Victor Eric Vickers, Watford, England, assignors to The General Electric Company Limited, London, England
Filed Sept. 19, 1963, Ser. No. 309,943
Claims priority, application Great Britain, Sept. 19, 1962, 35,747/62
12 Claims. (Cl. 219—91)

This invention relates to methods of resistance welding for use, for example, in the manufacture of electronic assemblies.

According to the present invention, in a method of resistance welding in which two metallic members are welded together by pressing them into contact with one another, the arrangement for pressing them into contact including an electrode which bears on a surface of one of the members, and passing an electric current across the junction between the members by way of a current path which includes the electrodes, said surface is provided with a layer of metal having a higher melting point than the metal of said members, this layer of metal not melting when the members are welded together.

Preferably said arrangement for pressing the members into contact includes another electrode which bears on a surface of the other member and which is also included in said current path, and said surface of the other member is also provided with a layer of said metal having a higher melting point than the metal of said members, this layer of metal also not melting when the members are welded together.

The metal of said members may be copper, in which case said layers of metal may be nickel. One of said members may be a lead of an electrical component, whilst the other member is part of a printed electric circuit.

Figure 1:
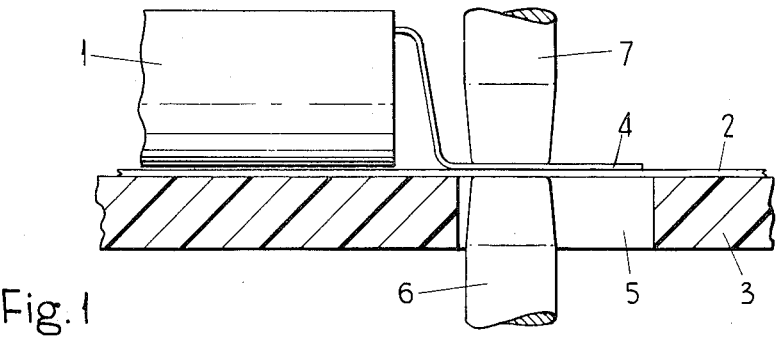
Figure 2:
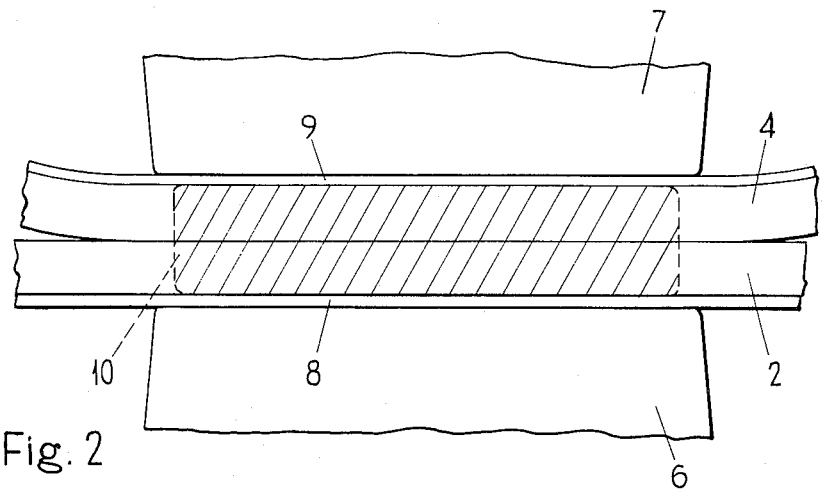
Figure 3:
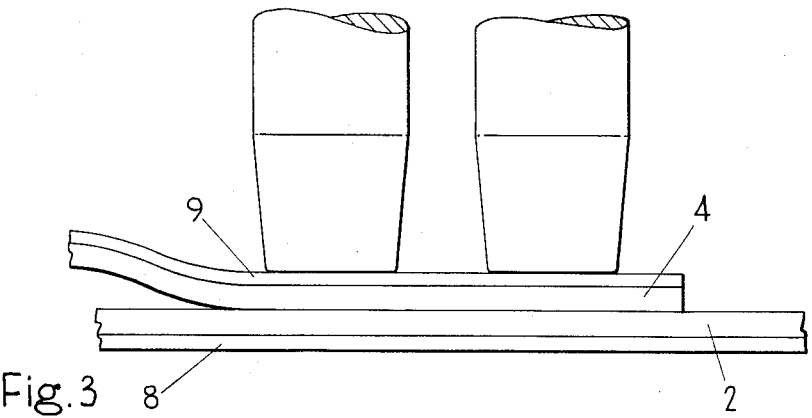

A method of resistance welding in accordance with the present invention will now be described by way of example with reference to the accompanying drawing in which, FIGURE 1 is a diagrammatic view of an electric component being welded to a printed electric circuit;

FIGURE 2 is a diagrammatic view on an enlarged scale of a section of the welded region of two welded members; and FIGURE 3 is a diagrammatic view of a single sided welding operation.

Similar components in the figures will be similarly referenced.

The method of welding to be described is used for making some of the electrical connections which are required in the manufacture of an electronic assembly including components such as that referenced 1 in FIG. 1, which are to be connected to a part of a printed circuit pattern formed in a layer of copper foil 2 bonded to the surface of a layer of insulating material 3. The component leads 4 are in the form of flat strips of copper.

To enable a component lead 4 to be resistance welded to the layer of copper foil 2, the layer of insulating material 3 is provided with a hole 5 in the appropriate position, through which a welding electrode 6 can be passed so as to bear on the surface of the layer of copper foil 2, remote from the component lead. With this welding electrode 6 bearing on the copper foil, a further welding electrode 7, which is axially aligned with the electrode 6, is brought into such a position that the component lead 4 is pressed into contact with the surface of the layer of copper foil 2 and a current path is completed. Passage of a welding current, by way of this current path, across the junction between the component lead 4 and the layer of copper foil 2, causes them to be welded together.

With this method the quality of the weld obtained is a function of the pressure between the electrodes and of the electrical energy dissipated at the junction, when the welding current is passed. To obtain a weld having high tensile strength these variables have to be controlled within quite narrow ranges. Unfortunately, these ranges are not wholly stable, and they tend to change when a large number of welds has been made. As a result, the setting of these variables at values which result in a satisfactory weld initially, may not be satisfactory later. This difficulty is thought to be largely due to the electrodes becoming contaminated with copper and then, when so contaminated, tending to stick to the copper of the component lead or of the layer of copper foil. There is the further difficulty that with thin foils, typically 0.0015 inch thick, commonly used for printed circuits, the weld region tends to penetrate right through the foil to the electrode face.

These difficulties are largely avoided in the method in accordance with the present invention in which it is arranged that layers of metal having a higher melting point than copper are interposed between the electrodes and the copper of the component lead or of the layer of copper foil. The higher melting point metal used is nickel, although other metals may be used, such as, for example, tantalum, molybdenum, rhodium, chromium. The layer of foil i.e. the base metal, may also be a metal other than copper for example gold, silver, aluminum, tin. Where nickel is used as the high melting point metal it may be given a flash of rhodium. Ideally, the high melting point layers should have low electrical resistivity to reduce heat production in those outer layers. In cases, such as the copper-nickel combination described, where a high melting point is associated with a high electrical resistance, the containing metal, that is, the nickel must be used in thin layers.

To obtain the required layers of nickel, it is arranged that the layer of copper foil 2 has a thin coating of nickel 8 electroplated on to the surface which is to be bonded to the layer of insulating material 3, as shown in FIGS. 2 and 3. The layer of copper foil 2 may be 0.0015 to 0.002 inch thick, whilst the coating of nickel 8 may be 0.0001 to 0.0005 inch thick. (Incidentally, if the printed circuit pattern is formed by etching the copper foil with an etching fluid, the presence of the nickel on the underside of the copper foil may reduce the tendency for the fluid to undercut the edges of the copper foil, and may therefore reduce the tendency for the copper foil to peel off the layer of insulating material at some later time.)

It is also arranged that the component lead 4 has a coating of nickel 9 electroplated on to the side which the electrode is to touch. The thicknesses of the copper of the component lead 4 and of the coating of nickel 9 may be similar to the thicknesses quoted for the copper 2 and nickel 8 respectively, of the printed circuit pattern.

The melting point of copper is about 1080° C., whilst the melting point of nickel is about 1450° C. When the weld is made, therefore, it is arranged that the copper of the component lead and of the printed circuit pattern mel, and so fuse together to form the weld, but the nickel coatings do not melt. Whilst the weld is being made, therefore, the molten copper is contained between the still solid nickel coatings, and is so prevented from reaching and contaminating the electrodes. This is shown particularly in FIGURE 2 where the reference 10 indicates the weld region. In the case of some metal combinations it may be more convenient for associated processes of fabrication to use the high melting point layer as the original structure on which a lower melting point layer is electroplated.

If the component is one which it may be desired to mount either way up, both sides of the component lead may be provided with a coating of nickel. Similarly, if welds are to be made to either face of the printed circuit, both sides of the circuit may be provided with a coating of nickel. This means that when the weld is made there is a coating of nickel sandwiched between the two layers of copper. As, however, this coating is in the region where the highest temperature is reached, this coating will melt with values for the pressure and for the energy dissipated which will not cause the two outer coatings of nickel to melt. Single sided welds, that is, with both electrodes being positioned on one side of the work, may be made between strips and folds by similar plating techniques as shown in FIGURE 3. The low melting point foil is again sandwiched between the high melting point coatings only one of which then provides any substantial current path.

Although described as used in the making of electrical connections, the utility of the method of welding disclosed is not limited in this respect.

We claim:

1. A method of resistance welding two metallic members together comprising the steps of pressing one of said members, having on one surface an adherent layer of metal of higher melting point than the metal of that member, into contact with the other of said members by means of an arrangement including an electrode which bears on said surface, and passing an electric current across the junction between said members by way of a current path which includes said electrodes, said layer of high melting point metal remaining unmelted when said members are welded together.

2. A method of resistance welding as claimed in claim 1, wherein said arrangement for pressing the members into contact includes another electrode which bears on a surface of the other member which is also included in said current path, and said surface of the other member is also provided with an adherent layer of said metal having a higher melting point than the metal of said members, this layer of metal also not melting when the members are welded together.

3. A method of resistance welding as claimed in claim 2 wherein the metal of said members is copper and of said layers of metals is nickel.

4. A method of resistance welding as claimed in claim 3, wherein one of said members is a lead of an electrical component and the other of said members is part of a printed electric circuit.

5. A method of resistance welding according to claim 4 wherein both sides of said lead are provided with said layer of high melting point metal.

6. A method of resistance welding according to claim 5 wherein both sides of said part of a printed circuit are provided with a layer of high melting point metal.

7. A method of resistance welding two metallic members together comprising the steps of forming a composite layer of one of said members with a layer of metal of higher melting point, pressing said one member of the composite layer into contact with the other of said members by means of an arrangement including an electrode which bears on said layer of metal of higher melting point, and passing an electric current across the junction between said members by way of a current path which includes said electrode, said layer of high melting point metal remaining unmelted when said members were welded together.

8. A method of resistance welding as claimed in claim 7 wherein composite layers are formed with each of said members and respective layers of metal of higher melting point.

9. A method of resistance welding two metallic members together according to claim 7, wherein said composite layer is formed by electroplating.

10. A method of resistance welding two metallic members together comprising the steps of pressing one of said members, having on one surface a coating of metal of higher melting point than the metal of that member, into contact with the other of said members by means of an arrangement including an electrode which bears on said surface, and passing an electric current across the junction between said members by way of a current path which includes said electrode, said coating of high melting point metal remaining unmelted when said members are welded together.

11. A method of resistance welding two metallic members together comprising the steps of pressing one of said members, having on one surface an electroplated coating of metal of higher melting point than the metal of that member, into contact with the other of said members by means of an arragnement including an electrode which bears on said surface, and passing an electric current across the junction between said members by way of a current path which includes said electrode, said electroplated coating of high melting point metal remaining unmelted when said members are welded together.

12. A method of resistance welding two metallic members together comprising the steps of pressing one of said members, having on one surface a coating unitary therewith of metal of higher melting point than the metal of that member, into contact with the other of said members by means of an arrangement including an electrode which bears on said surface, and passing an electric current across the junction between said members by way of a current path which includes said electrode, said coating of high melting point metal remaining unmelted when said members are welded together.

References Cited by the Examiner

UNITED STATES PATENTS

| 1,056,061 | 3/1913 | Rogers | 219—91 |
| 1,094,141 | 4/1914 | Gnuchtel | 219—92 |
| 1,568,080 | 1/1926 | Meadowcroft | 219—118 |
| 2,151,758 | 3/1939 | Gier | 219—92 |
| 2,270,278 | 1/1942 | Dunn | 219—91 |

RICHARD M. WOOD, *Primary Examiner.*